(12) United States Patent
Thammasouk et al.

(10) Patent No.: US 11,963,564 B2
(45) Date of Patent: Apr. 23, 2024

(54) AUTOMATED GARMENT MANUFACTURING USING ADHESIVE BONDING

(71) Applicant: CreateMe Technologies LLC, New York, NY (US)

(72) Inventors: Khamvong Thammasouk, San Jose, CA (US); Yongqiang Li, San Francisco, CA (US); Jinhwa Jung, San Jose, CA (US); Benjamin R. Waller, IV, Oakland, CA (US); Heng Li, San Francisco, CA (US); Brett Jason Stern, Portland, OR (US)

(73) Assignee: CreateMe Technologies Inc., Newark, CA (US)

( * ) Notice: Subject to any disclaimer, the term of this patent is extended or adjusted under 35 U.S.C. 154(b) by 317 days.

(21) Appl. No.: 17/535,464

(22) Filed: Nov. 24, 2021

(65) Prior Publication Data

US 2022/0183411 A1 Jun. 16, 2022

Related U.S. Application Data

(60) Provisional application No. 63/117,942, filed on Nov. 24, 2020.

(51) Int. Cl.
| | |
|---|---|
| *A41D 27/24* | (2006.01) |
| *A41D 27/10* | (2006.01) |
| *A41H 43/02* | (2006.01) |
| *B29C 65/48* | (2006.01) |
| *B29C 65/52* | (2006.01) |
| *B29L 31/48* | (2006.01) |

(52) U.S. Cl.
CPC ......... *A41D 27/245* (2013.01); *A41D 27/10* (2013.01); *A41H 43/0242* (2013.01); *A41H 43/0257* (2013.01); *B29C 65/4825* (2013.01); *B29C 65/524* (2013.01); *A41D 2300/52* (2013.01); *B29L 2031/4842* (2013.01)

(58) Field of Classification Search
None
See application file for complete search history.

(56) References Cited

U.S. PATENT DOCUMENTS

| | | |
|---|---|---|
| 3,681,785 A | 8/1972 | Truman |
| 3,696,445 A | 10/1972 | Craig |
| 4,145,388 A | 3/1979 | Off et al. |

(Continued)

FOREIGN PATENT DOCUMENTS

| | | |
|---|---|---|
| DE | 102011101484 A1 | 11/2012 |
| JP | 2017222969 A | 12/2017 |

(Continued)

OTHER PUBLICATIONS

PCT, Notification of Transmittal of The International Search Report and The Written Opinion of The International Searching Authority, or The Declaration for Application PCT/US2021/060801 dated Mar. 17, 2022.

*Primary Examiner* — Barbara J Musser

(57) ABSTRACT

Systems and methods are described that provide for automated manufacturing of garments using cutting, folding tools and adhesive dispensers operating on continuous webs of fabric webs to manufacture garments in an efficient manner while improving quality and overcoming material handling issues resulting from the properties of fabrics.

20 Claims, 10 Drawing Sheets

(56) References Cited

U.S. PATENT DOCUMENTS

| | | | |
|---|---|---|---|
| RE30,520 E | 2/1981 | Pierron | |
| 4,493,116 A | 1/1985 | Niethammer et al. | |
| 4,509,443 A | 4/1985 | Martell et al. | |
| 4,795,956 A | 1/1989 | Beck | |
| 9,623,578 B1 | 4/2017 | Aminpour et al. | |
| 10,664,629 B2 | 5/2020 | Gupta et al. | |
| 10,842,213 B2 | 11/2020 | Campbell, Jr. | |
| 11,014,347 B2 | 5/2021 | Brown et al. | |
| 2003/0051286 A1 | 3/2003 | Gregg | |
| 2005/0087607 A1 | 4/2005 | Stromberg | |
| 2009/0018691 A1 | 1/2009 | Fernandez | |
| 2011/0076479 A1 | 3/2011 | Danielson et al. | |
| 2013/0254970 A1 | 10/2013 | Curran et al. | |
| 2017/0112687 A1 | 4/2017 | Pauli | |
| 2019/0125591 A1 | 5/2019 | Hagita et al. | |
| 2020/0406598 A1* | 12/2020 | Brown | C09J 177/00 |
| 2022/0225710 A1 | 7/2022 | Brisbin et al. | |
| 2022/0225717 A1 | 7/2022 | Chope et al. | |

FOREIGN PATENT DOCUMENTS

| | | |
|---|---|---|
| WO | 2017175706 A1 | 10/2017 |
| WO | 2020184779 A1 | 9/2020 |

\* cited by examiner

AUTOMATED GARMENT MANUFACTURING USING ADHESIVE BONDING

CROSS-REFERENCES TO RELATED APPLICATIONS

This application claims the benefit of and priority to U.S. Provisional Application No. 63/117,942, filed on Nov. 24, 2020, the content of which is herein incorporated by reference in its entirety for all purposes.

FIELD OF THE INVENTION

The present invention relates to systems and methods for automated fabrication of garments and similar articles.

BACKGROUND

Despite technological advances and introduction of automation in many types of manufacturing, garment manufacturing remains very labor intensive. Sewing machines were invented in the early nineteenth century and were made possible based on the development of the lock stitch sewing technique. Today, some hundred fifty years later, this same technology remains the foundation of garments manufacturing. The modern process of producing large quantities of ready-to-wear apparels relies heavily on manual labor and relative to other industrial manufacturing it remains inefficient. Garment manufacturing includes multiple steps including sizing, folding, fitting, cutting, sewing, material handling. The type of tasks needed dictates the level of skilled labor that is required to perform the work. The unique and varied properties of fabric such as weight, thickness, strength, stretchiness and draping as well as the complicated nature of tasks required in apparel manufacturing complicates material handling and automated garment manufacturing.

The garment manufacturing process starts with cutting one or more layers of fabric based on patterns and dimensions matching the desired garment. Then, the cut fabric patterns are transferred from workstation to workstation, where at each workstation, one, two or more pieces of fabrics are manually folded, overlapped along the seams and fed into a sewing or serger (overlocker) machine. Given the variety of fabrics, threads, seam types and stitch types found in a finished garment, a larger number of workstations with specialized tools and skilled operators is required for assembling a garment. This means the fabrics or unfinished garments spend a lot of time in transit between workstations. Unlike most many manufacturing industries benefiting from twenty first century innovations and advances in material handling, in most small and large apparel manufacturing factories, most of the material handling and apparel manufacturing operations are conducted in a manual or semi-manual manner.

Currently, despite advances in technology, machines still struggle with performing certain tasks that are easily handled by a trained worker with average hand-eye coordination skills. This is one reason garment manufacturing industry is in a constant search of cheaper human labor rather than investing in advanced automated manufacturing systems. So, in many cases, the difference between small and large garment manufacturing operations is the number of workers it engages, To increase production, a factory may add additional production lines in parallel. However, in general, increasing production in this manner does little to improve efficiency. Even in large factories, most work is performed in piecemeal fashion, with limited coordination between various stations/steps, and movement of material between each station requires a great deal of manual product handling. Therefore, the entire garment manufacturing process remains labor intensive and inefficient, where work is performed in a discontinuous batch processing fashion, causing apparel manufacturers to move from country to country in a continuous search for lower labor costs for manual and semi-skilled labor.

Most of the innovations in the garment manufacturing industry have been directed to improving individual tools. For example, new features may be added to a sewing machine to convert it from manual to a semi-automatic or automatic tool. However, all material handling needs would still require a manual manipulation, including loading, unloading piecemeal work in and off the tool.

Few garment manufacturing innovations attempt to address the inefficiencies of the apparel manufacturing process at the system level. Continuous methods and systems have been proposed but all include limitations that have prohibited mass implementation of the system. US reissue patent. Re. 30,520 describes a "Method of Manufacturing Jackets and Like Garments" in an assembly line fashion, using at least two webs of fabric, one used to form the jacket and one used to form the sleeves. Although this patent proposes a continuous manufacturing process, garment formation restrictions force sleeve holes that extend to the neck hole, resulting in a garment with an undesirable shape and design, which may be at least one reason this manufacturing system does not appear to have been implemented in any production facility.

U.S. Pat. No. 3,681,785 entitled "Garment Production with Automatic Sleeve Placement" describes a continuous garment manufacturing system where left and right pre-formed sleeves are placed and secured to the back panel of a jacket or shirt that is patterned on a continuously moving web. The system proposed in this patent requires the accurate registration and synchronization of the movement of garment body web to match the movement and placement of each individual sleeve accurately with respect to a moving web under very tight manufacturing tolerances. This synchronization is further complicated by the proposed handling of each sleeve, lacking stiffness and yet required to be flipped 180 degrees from their resting position onto its destined location on garment body on the web. The material handling requirements of the '785 patent are impractical and due to the pliable nature of any garment fabric and the required accurate placement of the sleeves on the garment body on the web.

Similarly, U.S. Pat. No. 3,696,445 entitled "Garment Making Method," and U.S. Pat. No. 4,493,116 entitled "Method for Manufacturing Sleeved Garments" propose manufacturing methods for forming garments in an automated process. As in the previous disclosures, both '445 and '116 propose forming sleeves in a separate operation and attaching the sleeves in a synchronized fashion to the garment body, requiring timely and complicated cutting, placing and attaching operations that render the implementation of the proposed methods impractical.

Another constraint in today's garment manufacturing is the inability to efficiently produce in small batches or mass produce customized garments tailored to every consumer's body shape and measurements. Manufactures rely on economies of scale and require minimum order quantity which may be out of reach for small brands and designers. Given the heavily manual and piecemeal processes in the current manufacturing operations, small batches or mass customized production that requires constantly shifting product designs, material selections and sizing and sewing techniques result in production difficulties and resulting manufacturing errors and resulting lower yields. To satisfy the growing need in fulfilling small batch or mass customized orders, garment manufacturing systems that are highly automated, programmable, and reconfigurable to accommodate an increasing mix of design, material selection, sizing and joining techniques are desired.

BRIEF DESCRIPTION OF THE DRAWINGS

For a fuller understanding of the nature and advantages of this invention, as well as the preferred mode of use, reference should be made to the following detailed description read in conjunction with the accompanying drawings. The drawings are not presented to scale unless specified otherwise on an individual basis.

DETAILED DESCRIPTION

Figure 1:
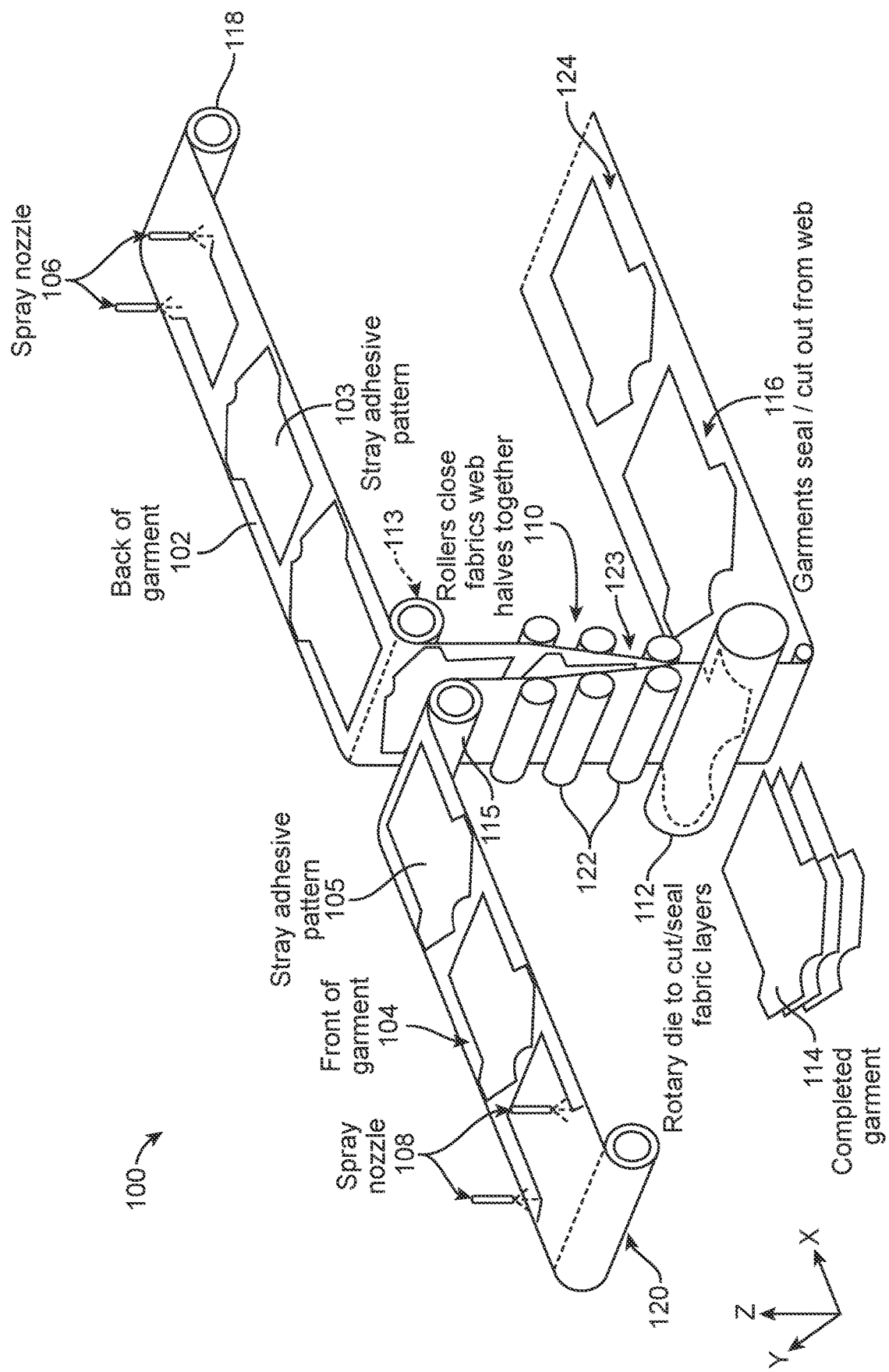
FIG. 1 shows an automatic garment manufacturing system according to some exemplary embodiments of the present invention.

The following description includes the best embodiments presently contemplated for carrying out the invention. This description is made for the purpose of illustrating the general principles of this invention and is not meant to limit the inventive concepts claimed herein in any way.

Some embodiments based on the present disclosure provide for systems and methods for transferring and manipulating fabrics and joining garment components during garment manufacturing in a way that is more suitable to automation. Some embodiments provide for garment manufacturing systems and methods that are reconfigurable to enable both mass production of customized garments and small batch processing with reduced human intervention.

As previously mentioned, traditional methods of making a garment require converting various measurements of body parts into two dimensional layouts (panels) corresponding to the various garment pieces or sections, cutting garment pieces out of webs of fabric, and using a variety of manual or semi-manual operations requiring a great deal of hand-eye coordination and manipulation to assemble together the various pieces of fabric to make a garment. This heavy reliance on manual processes is inefficient when compared to most modern manufacturing systems and processes. Additionally, reliance on manual labor, especially labor with specialized skills is expensive, and inherently more prone to errors depending on the required skill, resulting in products lower yields due to higher defects, resulting in more rejections and increase costs. Simply put, the current garment manufacturing process remains heavily reliant on antiquated systems and processes carried over from the industrial revolution from the beginning of the 19th century. Therefore, it would be highly desirable to create systems and processes for garment manufacturing that lend themselves to significantly reduced reliance on manual product manipulation and handling, promote continuous garment manufacturing methods over piecemeal processing, and offer flexible systems that can mass produce items while allowing for customized production.

Embodiments based on the present disclosure cover processes that combine an adhesive to effect the permanent bonding of a variety of types of fabric, with a series of integrated mechanical processes to eliminate or greatly reduce material handling issues and the human intervention traditionally required in the garment manufacturing process. This will increase the speed and efficiency of the processes, improve the overall quality of the finished garments and provides for flexible systems that can mass produce items while allowing for customized production, whereby production items can be adjusted to individual size and style. Exemplary embodiments of the present invention provide for seam formation, joinder and cutting tools that are adaptable and programmable such as to allow automated and customizable garment manufacturing systems and processes.

Exemplary embodiments of the present disclosure will be described with reference to the manufacture of T-shirts. However, it would be understood that these described exemplary embodiments may be easily adapted to produce other types of garments including long sleeve shirts, dress shirts, jackets, pants, gloves, or non-garment products such as bedsheets, pillow case, table cloth, rugs or handbags, etc. Therefore, the exemplary embodiments of this disclosure should not be interpreted as limiting the scope of the present disclosure.

Turning now to the drawings, FIG. 1 illustrates an automatic garment manufacturing system according to some exemplary embodiments of the present invention. The automated garment manufacturing system 100 of FIG. 1 is designed to eliminate or reduce manual labor. As shown in FIG. 1, system 100 includes a first web 102 including the back half 103 of a garment 114 (a T-shirt in the current example) corresponding to a given design and size. A second web of fabric 104 includes the front half 105 of the T-shirt 114.

In some embodiments, a web may comprise a continuous flat layer of fabric laid out in two dimensions. In some embodiments, the web may include shapes other than a flat sheet, including any three-dimensional shape such as a tube or other shapes. In some embodiments, the web may not include a continuous sheet of fabric. In some embodiments, the web may act as a scaffolding (not shown in the drawing) or carrier for fabric components that are secured to the web by some means and are acted on as the web travels through a path. In some embodiments one or more webs may include perforations along one or more borders. In some embodiments, one or more webs may be coupled to a scaffolding (not shown in the drawing) that includes perforations along one or more borders. In some embodiments, one or more fabric webs (e.g. webs 102 and 104) may include perforated borders made of the same material as the web and integral to the web or made of the same or different material than the web and is attached to the one or more fabric web. In some embodiments, the border perforations of the web or the scaffolding may be used to pull the web along a given path by a system of one or more gears, providing control of the movement of the web and synchronizing the movement of the web to other moving components of the exemplary manufacturing system. In exemplary embodiments, the sheet of fabric 102 is dispensed from the fabric roll 118 that is operable to rotate about its axis and dispense the web 102 along the X-axis. Similarly, web 104 is dispensed from the fabric roll 120 that is capable of rotating about its axis and dispensing the web 104 along the X-axis. In some embodiments, roll 118 and/or roll 120 are coupled to one or more actuators, gears, motors (continuous or step) that rotate at a selected speed pulling or pushing the web along the X-axis. In some embodiments, rolls 118 and 120 are free to move but are not mounted on motorized shafts. In these exemplary embodiments, the webs 102 and 104 may be pulled by one or more actuators or motors located at suitable locations other than roll 118 or 120. In some embodiments, actuators or motors are located at rollers 113 and 115, rollers 122 and 123, rotary die roller 112, and/or other suitable locations, providing pull or push forces acting on the webs 102 and 104. In some embodiments, one or more rollers include actuating means that are operable to being actuated independently and activated in a way to distribute the application of the pull or push forces along the webs 102 and 104 to reduce the chances of damaging the fabric by overly stressing, straining or even tearing fabric web at one or more locations. In alternative embodiments, the webs 102 and 104 may have borders made of the same or different material, that may be perforated or include a greater friction coefficient, and where the border material is reinforced or inherently has greater tensile strength and provides for an area that may support and tolerate greater stress or strain forces than the fabric web materials can tolerate without affecting the quality of the fabric webs.

In some embodiments, the front half contour 105 and/or back half contour 103 of the T-shirt 114 include markings to further define the T-shirt 114's borders on the corresponding webs 102 and 104. In exemplary embodiments, the front half and back half contours 105 and 103 of the T-shirt 114 may be temporarily marked by visible, invisible, or washable ink. In other embodiments, no demarcation may be used to identify the contours of front half 103 or back half 105 of T-shirt 114. In some embodiments, the outer face of the back half 103 and front half 105 of the T-shirt 114 may be facing out as shown in FIG. 1. In some embodiments, back half 103 and front half 105 are arranged inside-out, so that the interior face of each half of T-shirt 114 would be facing out.

In exemplary embodiments, adhesive dispensers 106 and 108 dispense adhesive along the contours of the back half 103 and/or front half 105 of the T-shirt 114, except may be in the neckline region, sleeve opening and bottom opening of the T-shirt 114. The regions with no adhesive may remain open and form the neck, arms and body holes after the final cutting and finishing steps further described below.

In exemplary embodiments, after the deposition of the adhesive, web 102 and the web 104 continue to travel along the X axis toward a joinder point where webs 102 and web 104 are pressed together using one or more rollers (e.g. rollers 110, 122 and 123). In some embodiments, beyond the joinder point, the web 102 and web 104 are pressed together using a predetermined force, heat, radiation or moisture to activate any adhesive applied to the back half 103 and front half 105 of T-shirt 114, and attach the back half 103 and front half 105 of T-shirt 114 to form a integral complete garment. In some embodiments, in addition to pressure, heat, radiation or moisture are applied to web 102 and web 104. In some embodiments, the rollers 110, 122 and 123 supply pressure, heat, radiation, or moisture uniformly to the web 102 and web 104. In some embodiments, pressure, heat, radiation, or moisture may be applied only to certain regions of the back half 103 and front half 105 contours that have applied adhesive. In some embodiments, the pressure, heat, radiation, or moisture may not be applied through the rollers. In some embodiments, some or all the pressure, heat, radiation, or moisture may originate from sources other than the rollers 110, 122 and 123. In some embodiments, heat and radiation may be applied by conduction, radiation, or convection. In some embodiments, energy sources such as lasers, heat guns, or hot plates may supply the energy.

It should be apparent that synchronization of the movements of web 102 and web 104 are important. In some embodiments, mechanical means such as belts, chains gears and sprockets are used to actuate the movement of web 102 and 104 in sync. In some embodiments, electronic controls along with variable speed motors and/or step motor may be used to control the movement and speed of webs 102 and 104 in order to maintain web 102 and web 104's movement in synch and provide for the accurate registration and alignment of the back half 103 to the front half 105 of T-shirt 114. In some embodiments one or more webs may include perforations along one or more borders to be operable similar to a chain and sprocket conveyance mechanism operating on one or more webs 102 and 104, or any other webs (not shown in FIG. 1). In some embodiments, one or more webs may be coupled to a scaffolding (not shown in the drawing) that includes perforations along one or more borders. In some embodiments, the border perforations of the web or the scaffolding may be the mechanism that receive the conveyance forces propelling the web along its path, control the movement of the web, and synchronize the movement of the web to other moving components of the exemplary manufacturing system. Exemplary embodiments of this disclosure require the synchronization of fewer number of moving parts and allows for a more accurate control of the movement of any web, thus providing for exemplary systems and methods according the present disclosure that are more easily implementable, resulting in improved production quality, fewer defects, a higher production yield and lower material and manufacturing costs.

With reference to FIG. 1, after one or more rollers 110, 122 and 123 join the back half 103 and front half 105 of T-shirt 114 together, the two halves of T-shirt 114 are permanently, pressed to form T-shirt 114, In some embodiments, multiple rollers 122 and 123 operate on the webs 102 and 104 to join them together at the contours of T-shirt 114. In some embodiments, the rotary die 112 may further cut T-shirt 114 along its borders and out of the joined webs 102-104. In some embodiments, the rotary dies may cut the garment outside of the adhesive bondline, at the edge of the bondline or along an area within the bondline. In some embodiments, the rotary dies may be apply heat energy simultaneously with or after the cutting operation to melt or remelt the adhesive, the fabric or both to produce finished seams that are aesthetically more desirable, physically durable (prevent fraying) or both. In some embodiments, programmable and controllable cutters may be used to cut out the formed garment (T-shirt 114) from the joined webs. In some embodiments, programmable and controllable cutters traveling along predetermined cutting paths may be used to detach the formed garment from the joined webs. In some embodiments, cutters may be directed or aided by machine vision and supporting artificial intelligence (AI) used to identify the actual bondline and cut along it or at an offset from the bondline. In some embodiments, the rollers 122 and 123 may be equipped with pressure sensing elements to detect any bulging that may correspond to where bondlines are located and seams are formed, and communicating the sensor readout in real-time to the programmable cutters for more accurate positioning and cutting operation. In some embodiments, T-shirt 114 may be cut to be completely free of the web 102-104 combination. In some embodiments, fully or partially cutout T-shirt 114 may continue to travel on the web 124 to the next processing station. In some embodiments, instead of cutting, the garment 114's borders are perforated by needles that may result in garment 114 that may remain partially attached to the joined webs 102-104, for further processing to allow for easier handling of the garment 114 during processing. The garment 114 with perforated perimeter may be fully detached from the web during a cutting or stamping operation, at which point garment 114 is fully detached from the joint web 110-104. In some embodiments, the detached T-shirts 114 are separated from the web 102-104 and collected for further processing at subsequent operating stations where the T-shirt 114 may be processed to receive a collar, hemming of the sleeves, adding pockets, zippers, embroidery and packaging. In some embodiments the joined web 102-104 leftover material 116 may accumulate on a roller for ultimate disposal. In some embodiments, the leftover 116 of the joined 102-104 is further processed to form components used for forming liners, pockets, seams, hemlines, necklines or sleeve openings as described further below.

In some embodiments, I-shirts 114 remain fully or partially attached to the web 102-104 to continue to travel as part of the web 102-104 for easier material handling during additional processing. In some embodiments, additional processing may include customization operation of garment 114 including embroidery, DTG (direct-to-garment) printing, screen printing, etc. In some embodiments, after all processing is completed, T-shirts 114 are cutout of the web 102-104 and processed for final packaging.

Figure 2:
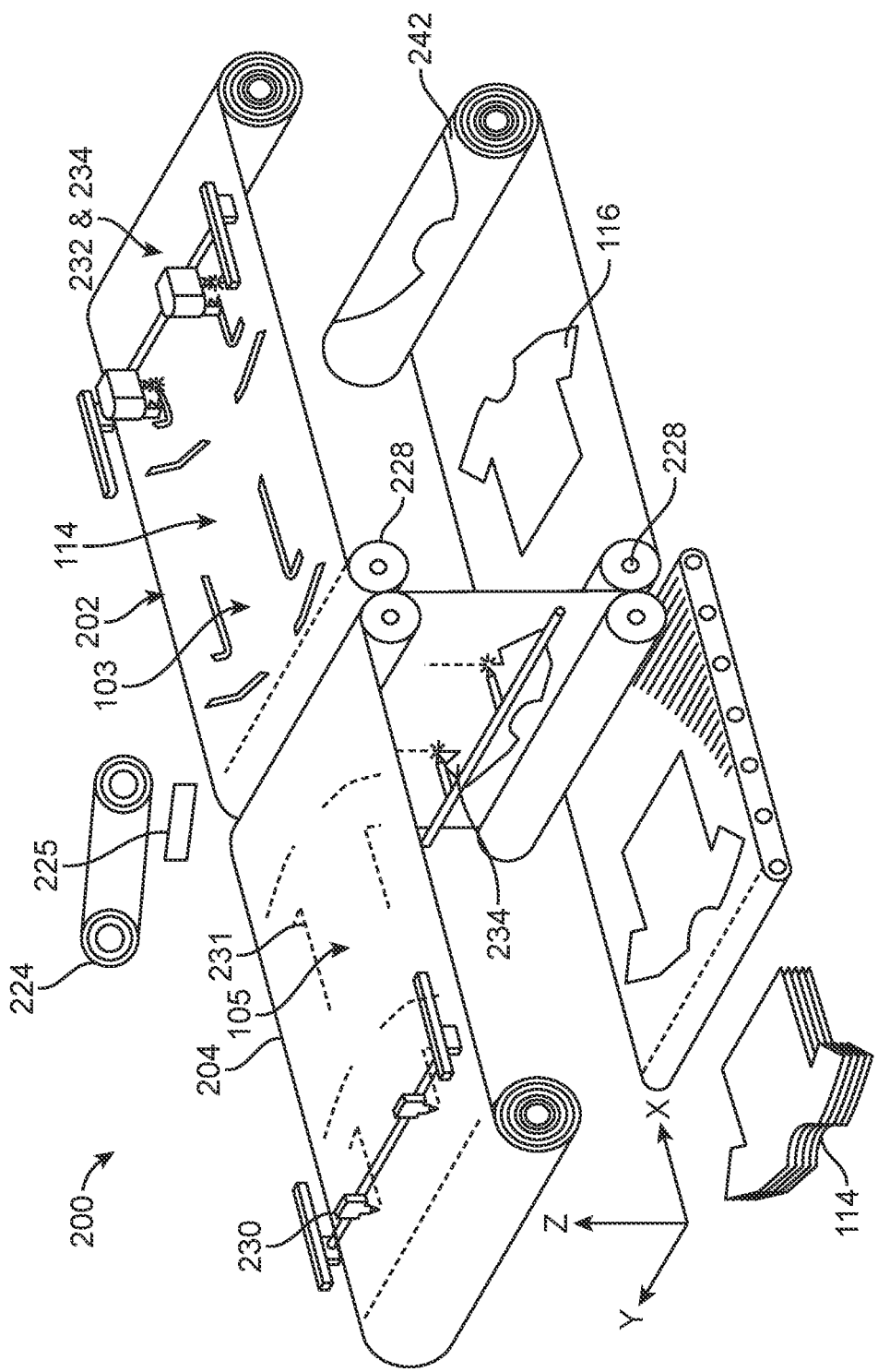
FIG. 2 illustrates a simplified depiction of the webs of fabric according to some exemplary embodiments of the present invention.

FIG. 2 illustrates another automatic garment manufacturing system according to some exemplary embodiments of the present invention. System 200 includes a first web 202, a second web 204, one or more rollers as represented by roller 228, one or more adhesive dispensing devices 230, folding devices 232, cutting devices 234 and optional additional fabric depositing devices represented by web 224. In exemplary embodiments, fabric depositing device 224 may deposit a strip of fabric at the hemline of back half 103 and front half 105 of T-shirt 114 to form a hemline seam. In some embodiments, adhesive 231 is deposited along the bottom perimeter of back half 105, front half 103 or both front half 105 and back half 103 prior to the fabric deposition by device 224. Therefore, as web 202 and web 204 moved forward past roller 228, joining back half 103 and front half 105 of T-shirt 114, a seam is formed at the T-shirt 114 hemline. In some embodiments, fabric pieces 225 supplied to form the hemline seam of T-shirt 114 are dispensed from a continuous web of fabric 224 (not shown here) and cutter 232 cuts each of the fabric pieces 225 to an appropriate length based on the T-shirt size. In some embodiments, fabric pieces 225 are precut and coupled to a web 224 that is operable to dispense fabric pieces 225 one piece at a time at the appropriate cadence to remain in synch with the movements of web 202 and 204, resulting in the fabric piece 225 to join the two parts of a garment to be formed at the desired location on the garment to form a seam, a pocket, a zipper, a logo, etc. In some embodiments, the the movement of web 202, web 204 and web 224 are continuous. In some embodiments, the movement of web 202, web 204 and web 224 follow a step movement. In some embodiments, one or more material web 224 may supply fabric pieces 225 to form a hemline, pockets, zippers and other ornamental or functional features. It should be understood that the fabric depositing devices may be located above web 202 and web 204, below web 202 and web 204, or some above one web and some below one web.

In some embodiments, folding tools or mechanisms 232 may be used to fold cut or uncut edges of one or more web 202 and web 204, before or after the deposition of adhesive on the article edges prior to folding and forming a seam. Folding tools and the formation of various types of seams will be farther discussed in FIGS. 5 and 6. Note that the exemplary folding tools 232 of FIG. 2 are shown as operative in the X-Y plane. In alternative embodiments, folding mechanisms 232, adhesive dispensing mechanisms 230, and cutting mechanisms 234 are operable to cut, fold and create seams along any direction in the plane of the fabric or perpendicular to it. In some embodiments, some, or all folding tools 232, adhesive dispensers 230 and cutting tools 234 may be stationary. In some embodiments, some, or all folding tools 232, adhesive dispensers 230 and cutting tools 234 are mobile in one or more directions. Once the operations of adhesive dispensing, cutting and folding have been performed, rollers 228 or equivalent devices will join the two webs 202 and 204, each including part of the garment (as illustrated here each web includes either a front half or a back half of the garment) are brought together and pressure, steam, heat, lasers and other types of lights or radiation, and other operations are performed on the joined webs to activate and/or cure the applied adhesive 231 and permanently fuse the garment sections together. It should be understood that mechanisms other than rollers may be used to perform one or more operations designed to attach garment parts together depending on the type of fabric, the article design, the type of adhesive used and other manufacturing parameters. Cutting tools 236 may cut along the borders of the formed garment to detach the garment from the joined webs 202 and 204. The formed garment 114 may be collected in one stack while the joined web with the cutout 116 may be collected in a web 242 for disposal or additional processing. For example, the excess fabric remaining on the joined webs 202-204 may be used to create components for seams, pockets, belt loops, etc.

Figure 3:
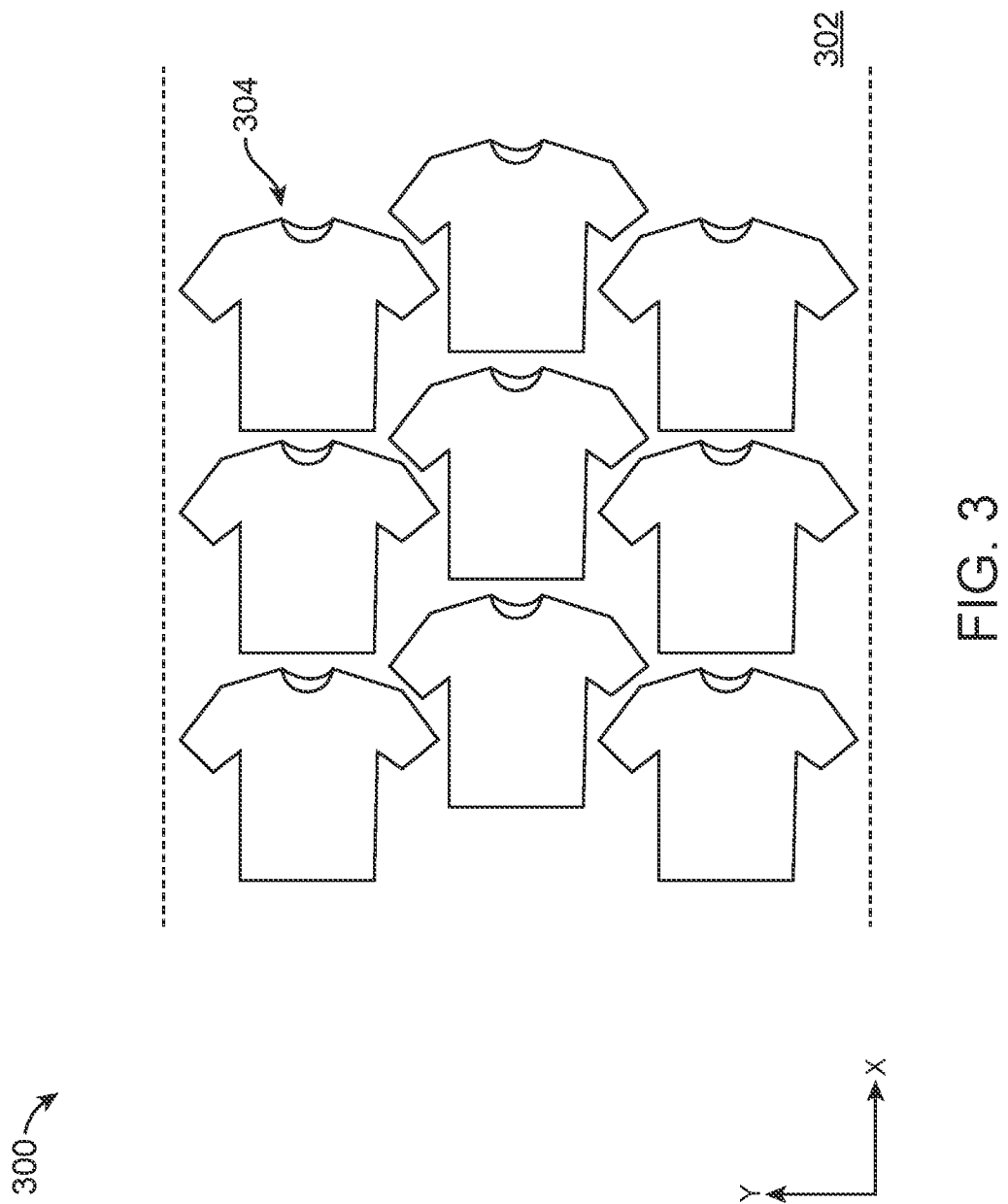
FIG. 3 illustrates alternative web layouts used in an automatic garment manufacturing system according to some exemplary embodiments of the present invention.

FIG. 3 illustrates alternative web layouts used in an automatic garment manufacturing system according to some exemplary embodiments of the present disclosure. In some embodiments, efficient garment pattern is laid out in panel layout 304 on the web 302 may be used to optimize a variety of factors. In some embodiments, developing a garment pattern layout 304 the web 302 requires optimizing various parameters including reducing fabric material waste, simplifying the layout and ease of implementing manufacturing operations. In some embodiments, optimum garment panel layout are configured using computers, software and artificial intelligence.

Figure 4:
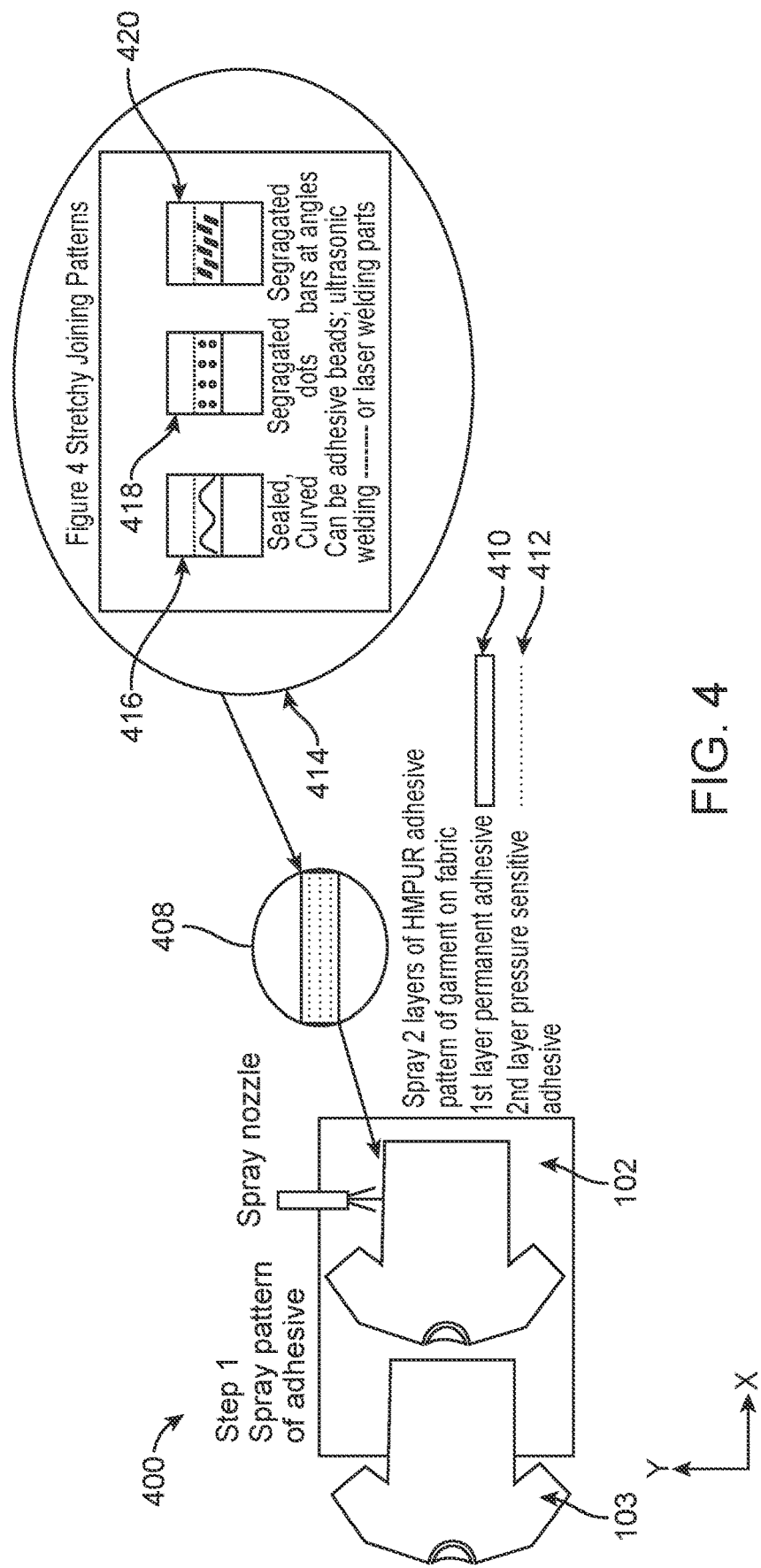
FIG. 4 illustrates methods of applying adhesive in an automatic garment manufacturing process according to some exemplary embodiments of the present invention.

FIG. 4 illustrates methods of applying adhesive in an automatic garment manufacturing process according to some exemplary embodiments of the present invention. In an exemplary system 400 of FIG. 4, adhesives are deposited along the borders of the back half 103 of T-shirt 114 while the back half 103 is still attached to the web 102. In exemplary embodiments, the adhesive may be applied in a solid, liquid, gel, or gaseous form. In some embodiments, the adhesive may be activated by heat, moisture in the air, pressure, lasers, lights or other forms of radiation, or a combination thereof. In some embodiments, the adhesive is applied to only one side of the garment, e.g. back half 103 in the illustrative example of FIG. 4. In some embodiments, adhesive may be applied to both sections of the garment 114, back half 103 and front half 105. In some embodiments, adhesive may be partially applied to each half of garment 114. In some embodiments, adhesive may be applied following different patterns for different sections of the garment 114 as the manufacturing requirements. In some embodiments, the perimeter for the application of adhesive to back half 103 (or front half 105 not shown in FIG. 4) may be defined to be larger or smaller than the actual size of the back half 103 (or front half 105 not shown in FIG. 4) of the garment. For example, the perimeter for the application of the adhesive to the back half 103 (or the front half 105) of the garment 114 may be larger than the boundaries of the back half of the garment 103 (or the front half 105). In that scenario, the subsequent cutting operation of the formed garment 114 may cut into the formed seam between the back half 103 and front half 105 of the garment 114 to achieve a desired functional or aesthetic property. In some embodiments, cutting into this border may be desirable to eliminate malformed seams or eliminate excess adhesive extrusions or bulging. In some embodiments, the garment border may be cut in such a manner to reduce the chances of garment fabric fraying. In some embodiments, the cutting process may be aided by heat to remelt the adhesive, the fabric or both at the newly cut joint to produce finished seams that are aesthetically pleasing, mechanically strong and durable or a combination of desired effects.

In some embodiments, the adhesion of back half 103 to the front half 105, or the adhesion of any other garment parts to another may be achieved using a laser. In some embodiments, a laser beam may be used to provide heat energy to activate one or more layers of adhesive acting to bind garment components. In some embodiments, garment parts made of synthetic fibers may be fused together directly using heat in any form such as a laser to melt the synthetic fibers of the garment parts.

In some embodiments, adhesives may be dispensed in a single layer. In some embodiments, adhesives may be dispensed in one or more layers. In some embodiments, a single formulation or type of adhesive may be used for all layers. In alternative embodiments, different types of adhesives with different properties may be used for different layers. In the illustrative example of FIG. 4, a hot-melt polyurethane (HMPUR) adhesive known for its application to garment fabric is used. One of the properties of HMPUR is its ability to react with moisture present in the air to change chemically and create a strong bond between materials. This bond may then continue to strengthen over 24-96 hours until it is fully cured. As such, HMPUR is a good adhesive for use with many types of textile materials. The HMPUR may be dispensed through a hot melt dispensing spray gun that can create specific graphic patterns on demand to allow for predetermined coverage and placement of adhesive on fabric. Other adhesives with different chemistry such as those of polyester, polyamide and epoxy may also be used.

In some embodiments, the adhesive is applied using one or more patterns, each pattern designed to achieve different properties. In some embodiments, the adhesive may be applied in a non-linear pattern such as serpentine, zig zag or curvilinear 416 manner within a defined band or border, along the perimeter of the back half 103 or front half 105 of garment 114. In some embodiments, certain adhesive patterns may provide a greater degree of movement or stretchability at the joint in a particular direction while still retaining sufficient seam strength. In some embodiments, the adhesive may be applied in discrete non-contagious dots 418, non-contagious stripes or ellipsoids 420, and positioned at one or more angles with respect to the borders of the garment. In some embodiments, the application of a pattern of non-continuous adhesive may impart the necessary bonding strength while reducing the amount of adhesive consumed as compared to a pattern requiring the continuous application of adhesive to the same area.

Figure 5:
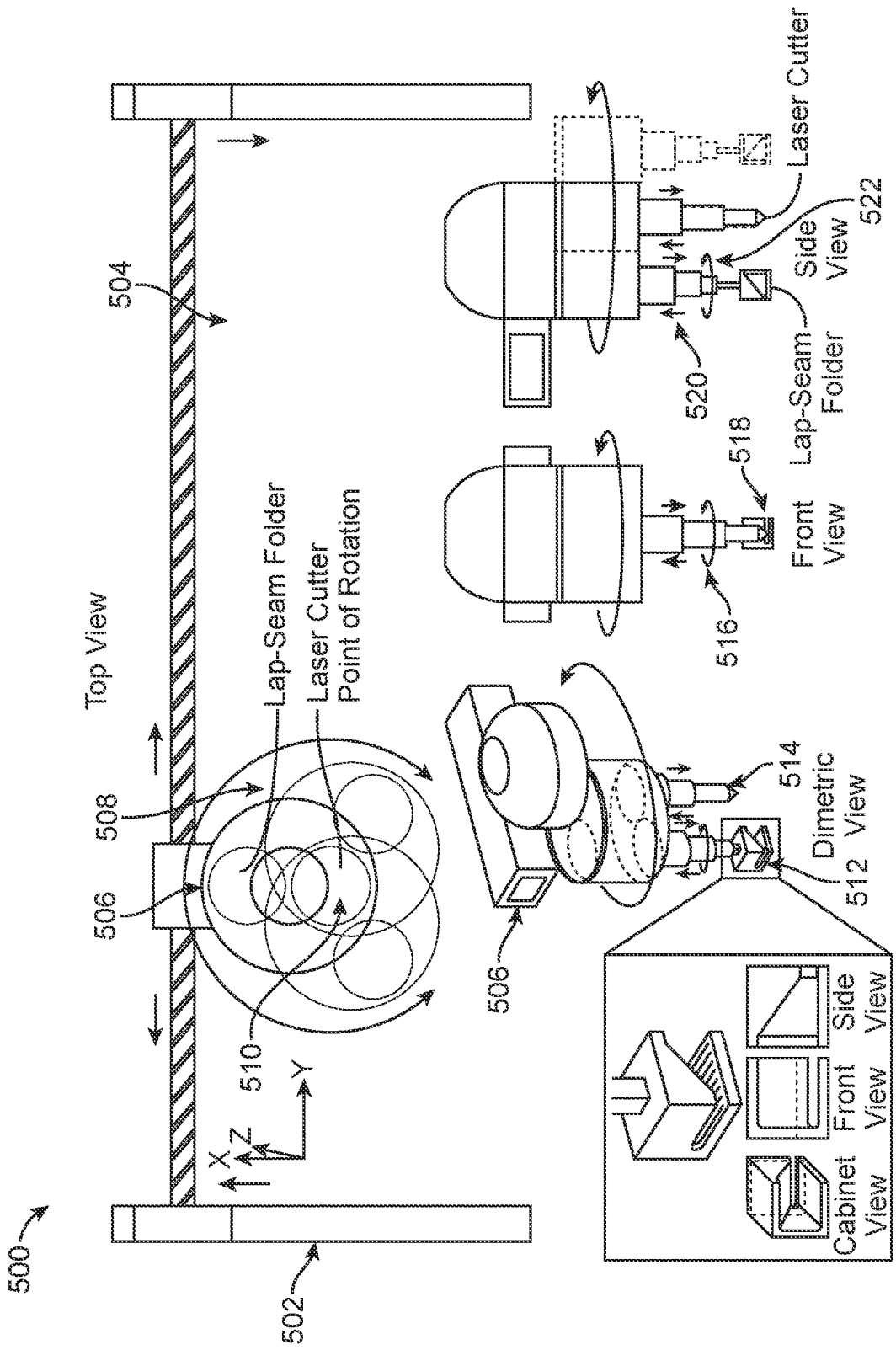
FIG. 5 illustrates exemplary systems for cutting, folding and seam formation according to some exemplary embodiments of the present invention.

FIG. 5 illustrates exemplary systems for cutting, folding and seam formation according to some exemplary embodiments of the present invention. As shown in FIG. 5, in some embodiments, the cut and fold mechanism 500 includes tools, structures and components allowing one or more cut/fold head(s) 510 to move in three dimensions, along the length of the web, along the width of the web, and in a direction perpendicular to the web. In some embodiments, rails 502 provide cut/fold head 510 mobility in a direction along the length of the webs 102, 104 (parallel to the X-axis as shown in FIG. 5) or any other web. Similarly, rail 504 provides for movement in a direction along the width of the webs 102, 104 (along the Y-axis as shown in FIG. 5) or along one or more directions with respect other webs. In some embodiments, cut/fold head 510 may be operable to turn on an axis which may be at an angle or perpendicular to the plane of the webs 102 and 104. In some embodiments, cut/fold head 510 may include mechanisms that can retract or extend folding tool 512 or cutting tool 514, providing for movements perpendicular to the plane of the web 102, 104 or other webs (along the Z-axis, into and out of the page as shown in FIG. 5), to disable or enable the cutting and folding tools from engaging with the web. In some embodiments, the cut/fold head 510 includes actuators or motors that operable to actuate the cut/fold head 510 in three dimensions. In some embodiments, actuator 506 includes one or more step motors, continuous motors, or other types of actuators that move cut/fold head 510 along rail 504. In some embodiments, rail 504 is coupled to rails 502 in such a way to allow rail 504 to move back and forth along the length of rails 502, providing for the cut/fold head 510 to travel along the length of webs 102 and 104 (X-axis) in addition to travels along the width of webs 102, 104 (Y-axis) or travel in the plane of other webs.

Figure 5A:
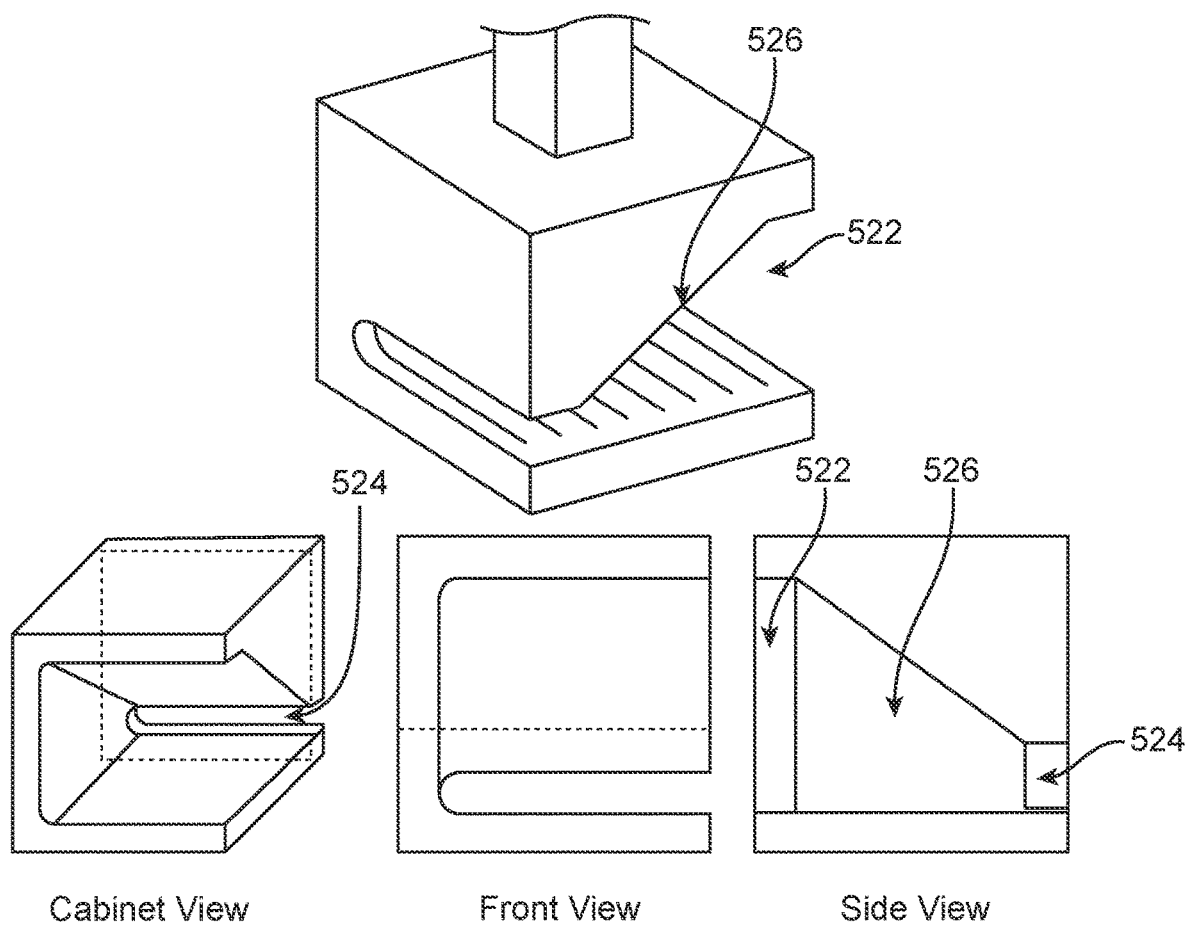

In some embodiments, cut/fold head 510 includes a folding tool 512 (also referred to as the folding head or folding mechanism) and a cutting tool 514. As shown in FIG. 5A illustrating a closeup view of the folding tool 512, in some embodiments, the folding tool 512 may include actuators that can extend or retract the folding tool 512 along an axis 516 (Z-axis) perpendicular to the plane of web 102, 104 or other webs. In some embodiments, the folding tool 512 includes gears, motors or other types of actuators that allow the folding tool 512 to rotate about an axis 518 (parallel to the Z-axis), providing finer movements of the folding tool 512. As shown in FIG. 5A, in some embodiments, the folding tool 512 may include an entry face 522 with a greater area or height, an exit face 524 with a smaller area or height, and a gradually narrowing channel 526 connecting the two faces 522 and 524. This design is operable to fold fabric edges as the folding tool 512 travels along a given path. As shown in FIG. 5, the folding tool 512 may move along any direction in three dimensions allowing the formation of seams corresponding to a variety of shapes and designs. In some embodiments, one or more folding tool 512 may be affixed to and stationary with respect to the garment manufacturing system but operable to allow webs 102 and 104 (or other webs not shown) to travel through the stationary folding tool. In the example of a fix folding tool 512, as a web 102 or 104 travels through a folding tool 512, it operates on the web and folds the fabric to form a fold and/or a seam. In some embodiments, folding tool 512 may include one or more apparatuses (not shown) such as rollers or plates operable to provide pressure and/or heat to enhance and/or maintain the folded edge of the web fabric 102 or 104, or to activate and cure any adhesives applied to form a seam. In some embodiments, one or more fixed folding tool 512 may operate alongside one or more mobile folding tools 512 to fold edges of web 102, web 104 or other webs, as the web in one or more directions. Fixed folding tools may be easier to implement but mobile folding tools provide greater flexibility. A non-stationary or mobile folding tool 512 as shown in FIGS. 5 and 5A that is operable to move in any direction in three dimensions and rotating in clockwise or counterclockwise directions up to 360 degrees with respect to a web would provide greater versatility to creating more complicated designs. In some embodiments, the cut/fold head 510 may include one or more folding tools 512, each including different physical or operational characteristics.

In some embodiments, the cut/fold head 510 includes a cutting tool 514. In some embodiments, each cut/fold head 510 may include a single tool such as a cutting tool 514 or a folding tool 512. In some embodiments, the cut/fold head 510 may include a cutting tool 514 and a folding tool 512 on the same tool head. In some embodiments, each cut/fold head 510 may include one or more cutting tools 514 and/or folding tools 512 based on the manufacturing processes and the garment design requirements. In some embodiments, the cutting tool 514 may be a mechanical cutter such as a knife, a blade, a scissor or needles. In some embodiments, the cutting operation is performed by needles that may perforate the borders of the garment 114 while leaving the garment 114 attached to the web until further processing completes the separation of the garment 114 from the joined webs 102 and 104. In some embodiments, the cutting tool 514 may use a laser cutter or other non-mechanical cutting devices. In some embodiments, the cut/fold head 510 may include one or more cutting tools 514, each including different physical or operational characteristics. In some embodiments, the cutting tool 514 may be extended or retracted along an axis (Z-axis) perpendicular to the plane of the web 102, 104 or other webs. In some embodiments, the cutting tool may operate in a fixed direction with respect to the direction of travel of a web and thus operable to cut the fabric in a fixed direction. In some embodiments the cutting tool may travel along any path as defined by combinations of X,Y coordinates and rotate in clockwise or counterclockwise directions up to 360 degrees with respect to the web. The ability to rotate may be required of a mechanical cutter to produce non-linear seams. The same limitation may not apply to non-mechanical cutters such as a laser cutter. In some embodiments, a cutting tool 514 is in a static position in front of the folding tool 512 with respect to the direction of motion. In some embodiments, the cutting tool 514 and folding tool's 512 positions with respect to each other are adjustable prior to the start of the manufacturing operations and/or dynamically during the manufacturing operations. In some embodiments, the cutting tool 514 cuts the web fabric 102, 104 and other fabric webs per the garment design specifications. In some embodiments, as the cutting tool 514 cuts the web according to the design specifications, the folding tool 512 may engage in folding the cut sections of the fabric into a desired fold or seam shape. In some embodiments, seams are formed after applying adhesive, folding and/or cutting web material per a given design specification that dictates the sequence and coordinates for the application of each adhesive, fold and cut operation. Various seam shapes may be achieved using the cut/fold system and method described in this disclosure. Exemplary seam formations are further described below in FIGS. 6A-6C. In some embodiments, fixed or mobile folding head 514 may fold fabric and form a seam by applying adhesive to the fold prior to the folding operation, with or without the need to engage the cutting tool 514 to cut any fabric. As described herein, cutting tool 514, folding tool 512 and adhesive application tools 106 (FIG. 1) can move in three dimensions allowing for the formation of complex shapes that may be required by some article designs. However, in some embodiments, the cutting tool 514 folding tools 512 and adhesive application tools 106 may be stationary along one or more directions. In some embodiments, a combination of stationary and mobile cutting tools 514, folding tools 512 and adhesive application tools 106 may be used. In some embodiments, the folder may include additional tools to apply pressure and/or heat to enhance or maintain the folded edge in shape after the fabric is folded by the folding tool 512. In some embodiments, the folding tool 512 is located close to rollers 228 (FIG. 2) (e.g. 10 mm to 100 mm). In some embodiments, the proximity of the folding tool 512 to the rollers 228 enhances the maintenance of the shape of the fold fabric because the folded fabric is kept taut under the tension in the web as it passes over the rollers 228 that changes the web's travel direction.

Figure 6A:
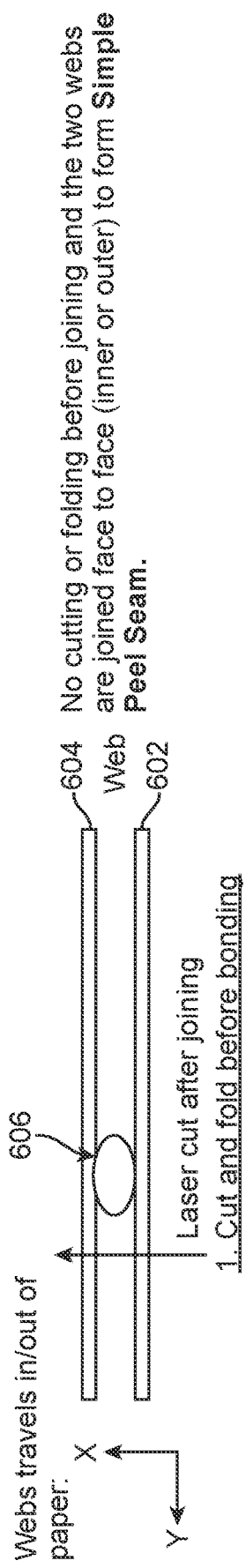
FIGS. 6A, 6B and 6C illustrate exemplary methods of seam formation as used in an automatic garment manufacturing process according to some exemplary embodiments of the present invention.
Figure 6B:
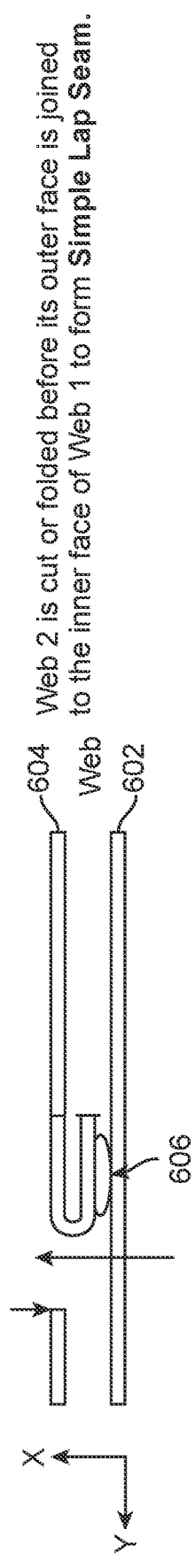
Figure 6C:
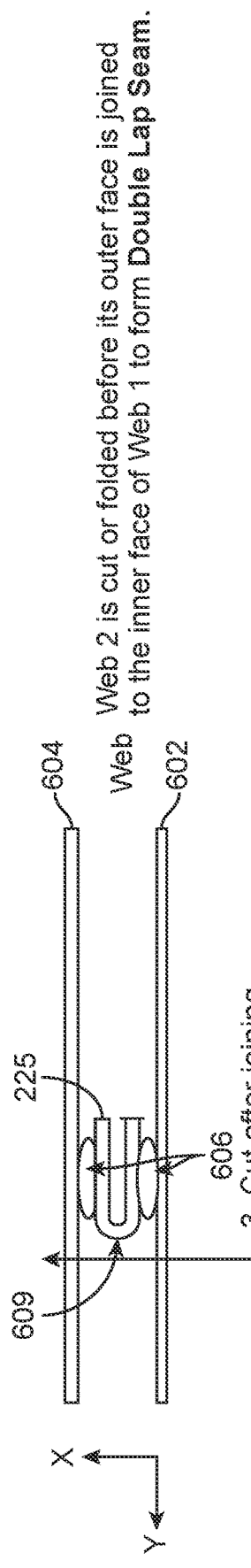

FIGS. 6A, 6B and 6C illustrate exemplary methods of seam formation as used in an automatic garment manufacturing process according to some exemplary embodiments of the present invention. FIG. 6A illustrates the formation of a simple peel seam or superimposed seam. As seen from FIG. 6A, the peel seam is formed by the application of adhesive 606 in-between web layer 602 and web layer 604 in a face to face configuration. After the formation of a bond between the two webs, excessive fabric is cut away from outside the bondline, the edge of the bondline or at some distance into the bondline, providing a finished and aesthetically acceptable simple peel seam. The peel seam of FIG. 6A is relatively simple to fabricate because it does not require cutting or folding of the fabric before joining the two edges of web layer 602 and web layer 604. However, the peel joint may have relatively low strength against forces that are applied perpendicular to the joint resulting in the joint coming apart or "peeling."

FIG. 6B illustrates the formation of a simple lap seam. As seen from FIG. 6B, the simple lap seam is formed by the application of adhesive 606 between web layer 602 and web layer 604 in a face to back configuration. The simple lap seam of FIG. 6B is formed by first cutting and folding web layer 604 so as to have its outer face facing and adhesively joined to the inner face of the lower web layer 602. After a bond formation step, the excessive fabric in web 602 may be cut to form a finished simple lap seam. The simple lap seam of FIG. 6B provides a higher strength against forces that are applied perpendicular to the joint.

FIG. 6C illustrates the formation of a double lap seam. As seen from FIG. 6C, the double lap seam is formed by the application of a piece of fabric 225 (as shown in FIG. 2) partially or completely coated with adhesive 606 on one side 609 between web layer 602 and web layer 604. After bond formation, excessive fabric on web 602 and web 604 may be cut to form a finished double lap seam. Double lap seams as shown in embodiments of FIG. 6C provides a higher strength against forces that are applied perpendicular to the joint. An advantage of a double lap seam may be aesthetics because a double lap seam may provide a cleaner looking finished seam on a garment.

It would be apparent to one skilled in the art that the above bonded seam types are illustrative examples only. A variety of bonded seams may be formed using the cutting, folding, inserting processes described in this disclosure. It would be apparent to one skilled in the art that one or more types of bonded seams may be required by the design or manufacturing specifications of a particular garment, in addition to limitations and requirements imposed by the nature of the fabrics and adhesives, aesthetic, endurance, sealing or permeability requirements of individual seams.

Figure 7A:
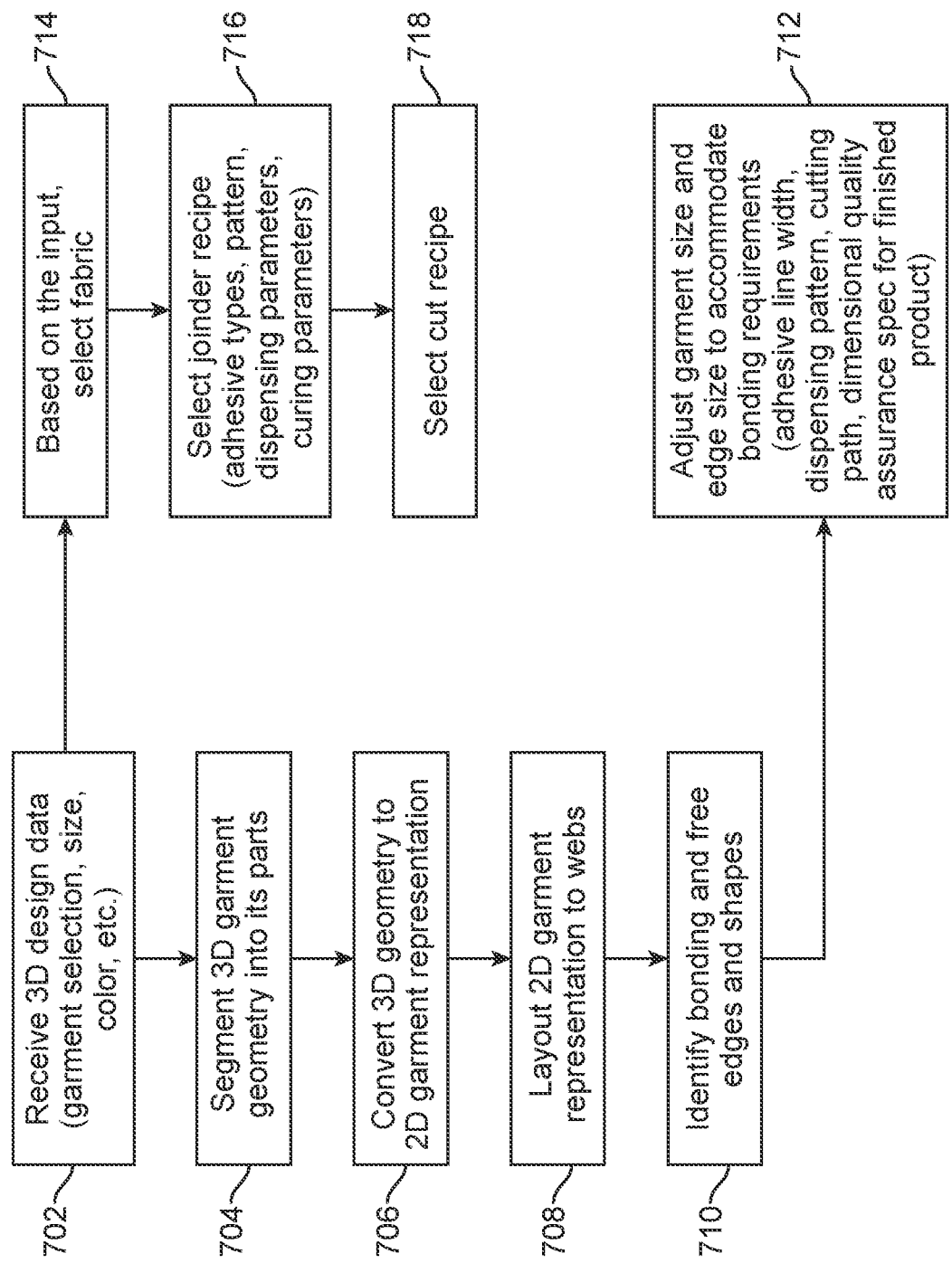
FIG. 7A illustrates an exemplary flow chart for processing design data used in an automated garment manufacturing process according to some embodiments.

FIG. 7A illustrates an exemplary flow chart for processing design data used in an automated garment manufacturing process according to some embodiments. As seen in FIG. 7A, an exemplary automated garment manufacturing process using adhesive may start with the operation 702 of receiving garment manufacturing design data including the selection of a garment style, selection of colors, the types of accessories such as pockets and zippers that are required, personalization choices such as a logo created using various garment printing processes, embroidery or other embellishment using other accessories. Additional design data may include 3-D measurements, dimensions and sizes of the particular garment and other particulars of the article as measured in three dimensions, for example by a specialized scanners. In operation 702, based on the 3D design data received, the garment type is selected (e.g. a T-shirt, long sleeve shirt or a jacket). Similarly, based on the received design data, fabric is selected and the size of the garment is determined. The size of a garment may be based on actual 3D measurements in the case of custom fit garments or based on a ready-to-wear size chart. In the case of a custom fit garment, the measurements of the various parts of the garment are determined directly from actual measurements obtained either by a scanner or a manual measuring. In the case of a ready-to-wear garment, dimensions of the various garment parts such as the length, width and girth of the body of the garment, the sleeves, the neckline, etc. may be derived from the size of the garment derived from a generalized size to dimension correspondence table.

In operation 704, the three-dimensional garment design data are converted into the dimensions of individual components of the garment to be manufactured. The garment dimensions may include length and width of the body, the sleeves, the neckline, etc. of the garment. Based on the type of the fabric selected, the garment component dimensions may be adjusted to account for fabric properties such as stretch.

In operation 706, the 3D geometries of the garment components are converted to a 2-D representations. In operation 708, the two-dimensional representations of the garment are mapped or laid out onto one or more fabric webs. In some embodiments, the pattern of mapping garment components on one or more fabric web is laid out in panels in such a way to simplify fabrication, minimize material waste, or both.

In operation 710, based on the dimensions of the laid-out garment, the type of fabric or the aesthetic design of the garment, the bonding edges, shapes and the free edges of the garment are identified. The layout of the garment on the fabric web may include the steps of selecting which garment component panels are to be laid-out on which web, (e.g. right, left, upper or lower web). Additionally, considerations for the layout of the garment panels may include laying out the garment pieces inside-out or outside-in, headfirst or bottom first, etc.

In operation 712, the garment layout dimensions may be adjusted to accommodate the appropriate bonding border requirements including adhesive line width, adhesive dispensing pattern, cutting path and dimensional quality assurance specification for the finish garment.

In a parallel process flow path, in operation 714, based on the received 3D garment design data, the automated garment manufacturing system 100 may select the corresponding fabric web and load each fabric web in preparation for the start of manufacturing. In some embodiments, the selection and loading and preparation of the fabric web may be performed manually, semi-manually or automatically. In some embodiments, some or most of the material handling operations required at this step may be done automatically, for example using robots and cobots.

In operation 716, based on the garment design data, a joinder recipe is selected which determines the adhesive type to be used, the adhesive patterns (straight, zigzag, serpentine) and the adhesive curing parameters.

Finally, in operation 718 the cutting recipe is determined based on garment design data. For example, a particular cutting recipe may be used to minimize material waste or achieve a certain aesthetic design requirement.

Figure 7B:
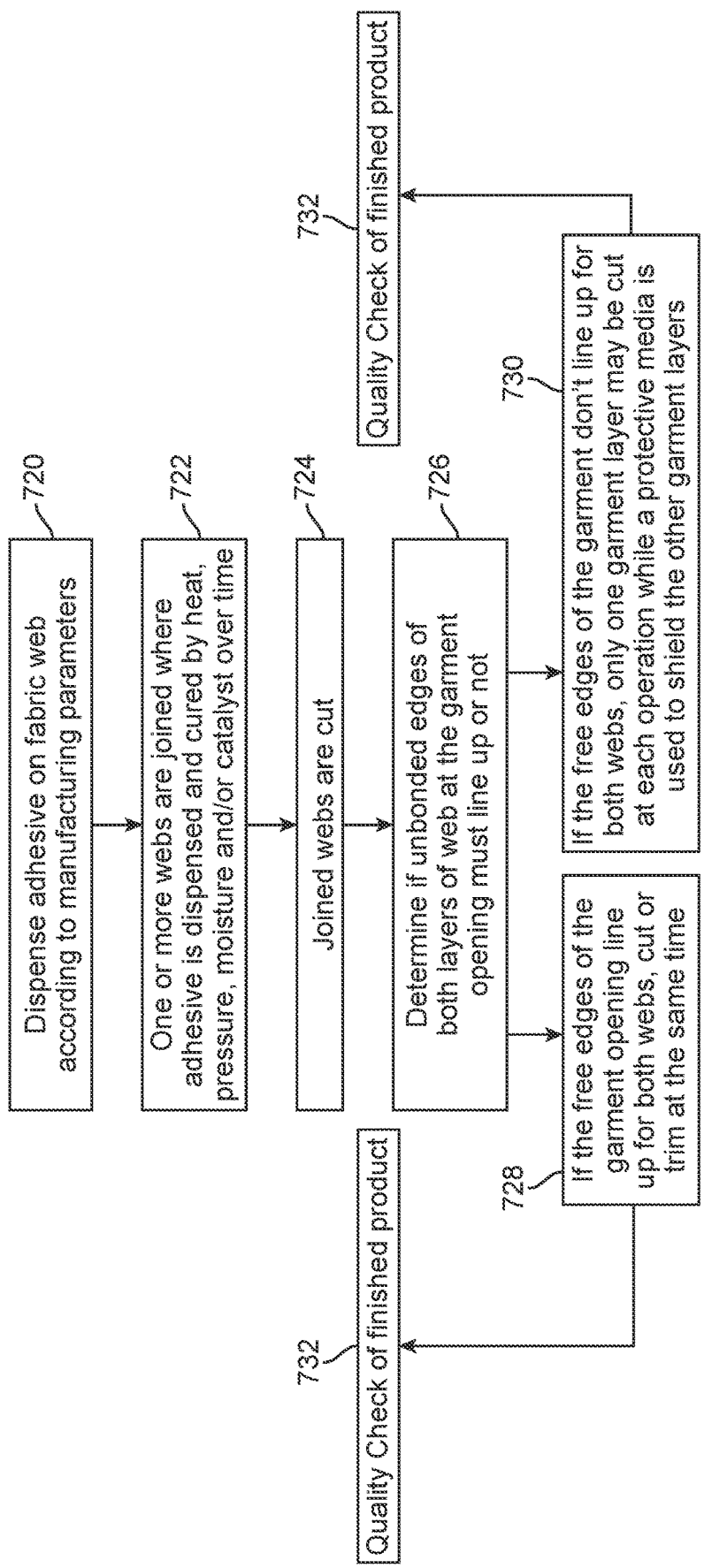
FIG. 7B illustrates an exemplary flow chart for cutting and joinder processes used in an automated garment manufacturing process according to some embodiments.

FIG. 7B illustrates an exemplary flow chart for cutting and joinder processes used in an automated garment manufacturing process according to some embodiments. The operations detailed in FIG. 7B are generally directed to forming edges and seams for a garment in an automated fashion.

In operation 720, adhesive is applied to on one or more moving fabric webs per the manufacturing recipe created in operation 716. In operation 722, one or more webs are joined at least along areas where adhesive has been applied. Heat, pressure, moisture, radiation and/or catalysts may be applied for a given period of time (as per the manufacturing recipe) to the joined areas to activate and cure the bond between the joined web regions. Each of the parameters used to create a joint may be individually tuned and adjusted to achieve the optimum bonded joint based on the garment type, the joint type, dimensions, type of adhesive, whether the joint must be waterproof or not, and the aesthetics of the joint.

In operation 724, the joined regions that are formed by bonding one or more web areas together are cut on the outside perimeter of the joint, along the edge of the joint or at some distance within the joint. In some embodiments, the cutting along the joints may be complete along the entire garment perimeter, in which case the garment is hereafter fully detached from the webs. In some embodiments, the cutting operation may be limited to specific boundaries of the garment that may include bonded edges and free edges where no adhesive has been applied. In some embodiments the cutting operation may achieve both a functional and an aesthetic function. In some embodiments, the cutting operation may be limited to certain areas of the garment perimeter and the garment remains attached to the fabric webs until further processing. In some embodiments, the cutting is performed using needles to perforate the web but not to completely detach the garment from the web. In some embodiments, the final detachment of the garment from the web may be performed at a later stage in the garment manufacturing.

In some embodiments, in operation 726, based on the garment design data and the corresponding manufacturing requirements, the system determines whether each layer of a garment part with unbonded free edges (e.g. sleeve holes, neck hole) must align to each other or not. For example, for increased comfort wear, some T-shirt designs may require the layer of fabric layer forming the back of the neck section to be longer (taller as measured from the T-shirt hemline) than the front layer of fabric comprising the neck hole.

In some embodiments, in operation 728, if the garment design data requires the open edges of the garment in some area to be aligned between the two webs, then a single cutting operation may be performed on both layers of the garment. For example, both the lower and upper layers of fabric forming the sleeve hole may be cut in a single cut operation.

In some embodiments, in operation 730, if the garment design data requires the opening fabric edges not to align (e.g the fabric layer of the back of neck hole must be longer than the fabric layer at the front of the neck hole), for each cutting operation, one fabric layer may be cut while the other fabric layers may be protected by an insert between the cutter and the other layers of fabric. For example, in the case of some T-shirt necklines, the edge of the back layer of fabric for the neck hole must be higher than the edge of the front layer of fabric for the neck hole. In such cases, the cutting operation may be performed in separate steps, using one or more cutters to cut a given fabric layer while protecting other fabric layers using a protective insert.

In operation 732, a quality inspection of the finished garment may be performed. In some embodiments, the quality inspection may be performed by human operators through a visual inspection. In some embodiments, a quality inspection may be performed using cameras using artificial intelligence. In some embodiments, the quality inspection may be performed while the finished garment is still attached to the web to simplify any material handling issues.

Figure 8:
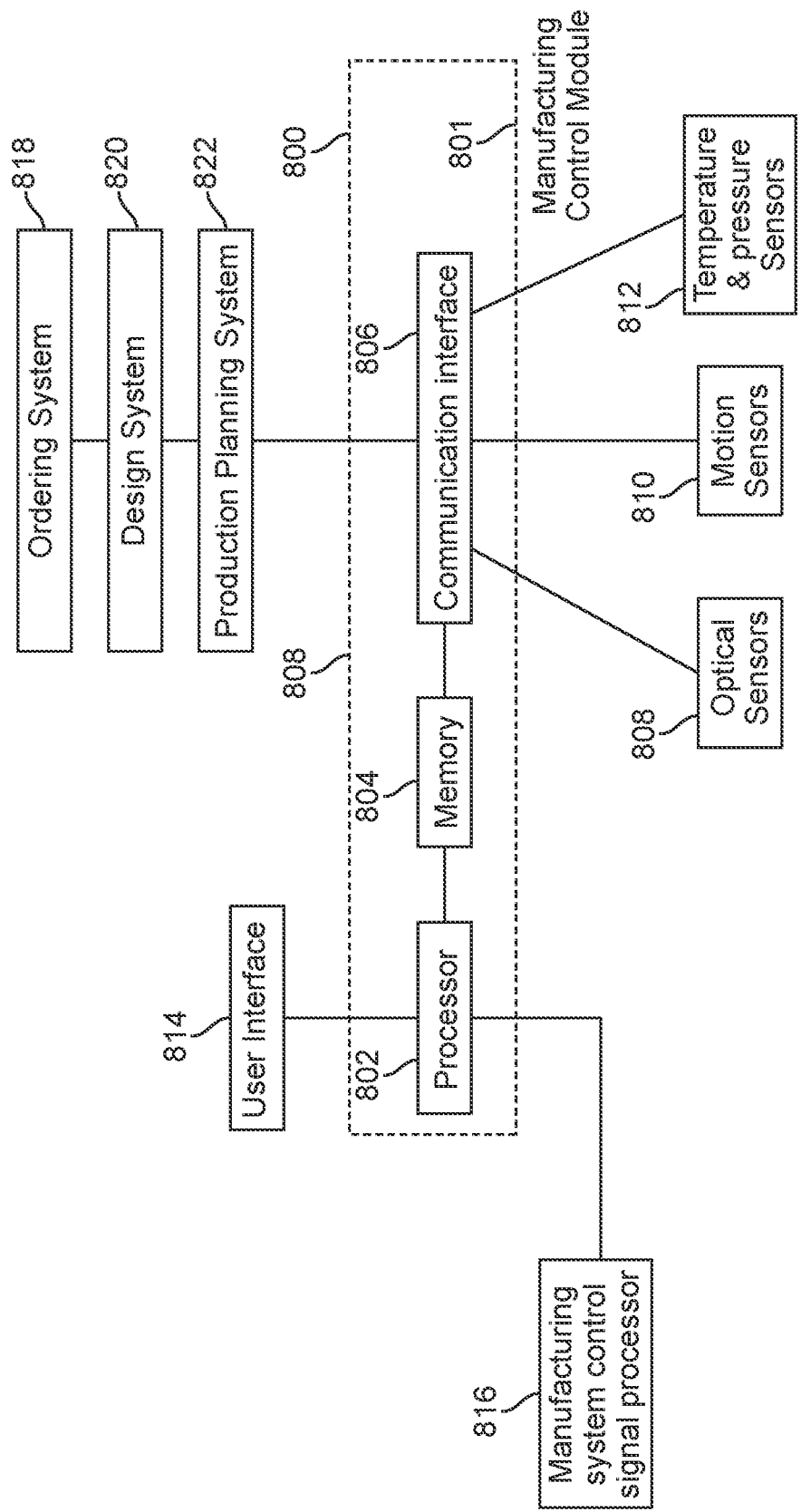
FIG. 8 illustrates an exemplary block diagram of a control system for an automatic garment manufacturing system according to exemplary embodiments of the present invention.

FIG. 8 illustrates an exemplary block diagram of a control system for an automatic garment manufacturing system according to exemplary embodiments of the present invention.

In some embodiments, the illustrative control system 800 includes a manufacturing control module 801 coupled to various components including one or more ordering system 818, one or more design systems 820, one or more production planning systems 822, one or more user interface devices 814, and one or more manufacturing system and control signal processor. In some embodiments, the manufacturing control module 801 may include one or more processors 802 coupled to memory modules 804 and one or more communication interfaces 806 to provide means for communicating with various automated garment manufacturing system inputs including one or more optical sensors and/or cameras 808, motion sensors 810 and temperature and pressure sensors 812. In various embodiments, various other types of sensors, not shown here, may provide relevant manufacturing parameters such as the level of moisture present in the factory air, viscosity of adhesive liquid, etc. Additionally, the manufacturing control module may include one or more power sub-systems and power backup systems not shown here.

The manufacturing control module 801 may be implemented at least partially in one or more computers, embedded systems, terminals, control stations, handheld devices, modules, any other suitable interface devices, or any combination thereof. In some embodiments, the components of manufacturing control system 801 may be communicatively coupled via one or more communications buses not shown here.

Processing equipment 802 may include a processor (e.g., a central processing unit), cache, random access memory (RAM), read only memory (ROM), any other suitable components, or any combination thereof that may process information regarding the automated garment manufacturing system 100. Memory 804 may include any suitable volatile or non-volatile memory that may include, for example, random access memory (RAM), read only memory (ROM), flash memory, a hard disk, any other suitable memory, or any combination thereof. Information stored in memory 804 may be accessible by processing equipment 802 via communications bus not shown. For example, computer readable program instructions (e.g., for implementing the techniques disclosed herein) stored in memory 804 may be accessed and executed by processing equipment 802. In some embodiments, memory 804 includes a non-transitory computer readable medium for storing computer executable instructions that cause processing equipment 802 (e.g., processing equipment of a suitable computing system), to carry out a method for controlling the automated garment manufacturing systems and processes. For example, memory 804 may include computer executable instructions for implementing any of the control techniques described herein.

In some embodiments, communications interface 806 includes a wired connection (e.g., using IEEE 802.3 ethernet, or universal serial bus interface protocols), wireless coupling (e.g., using IEEE 802.11 "Wi-Fi," Bluetooth, or via cellular network), optical coupling, inductive coupling, any other suitable coupling, or any combination thereof, for communicating with one or more systems external to manufacturing control module 801. For example, communications interface 806 may include a USB port configured to accept a flash memory drive. In a further example, communications interface 806 may include an Ethernet port configured to allow communication with one or more devices, networks, or both. In a further example, communications interface 806 may include a transceiver configured to communicate using 4G standards over a cellular network.

In some embodiments, user interface 814 includes a wired connection (e.g., using IEEE 802.3 ethernet, or universal serial bus interface, tip-ring-seal RCA type connection), wireless coupling (e.g., using IEEE 802.11 "Wi-Fi," Infrared, Bluetooth, or via cellular network), optical coupling, inductive coupling, any other suitable coupling, or any combination thereof, for communicating with one or more of user interface devices 814. User interface devices 814 may include a display, keyboard, mouse, audio device, any other suitable user interface devices, or any combination thereof. For example, a display may include a display screen such as, for example, a cathode ray tube screen, a liquid crystal display screen, a light emitting diode display screen, a plasma display screen, any other suitable display screen that may provide graphics, text, images or other visuals to a user, or any combination of screens thereof. Further, a display may include a touchscreen, which may provide tactile interaction with a user by, for example, offering one or more soft commands on a display screen. In a further example, user interface devices 814 may include a keyboard such as a QWERTY keyboard, a numeric keypad, any other suitable collection of hard command buttons, or any combination thereof. In a further example, user interface devices 814 may include a mouse or any other suitable pointing device that may control a cursor or icon on a graphical user interface displayed on a display screen. In a further example, user interface devices 814 may include an audio device such as a microphone, a speaker, headphones, any other suitable device for providing and/or receiving audio signals, or any combination thereof. In some embodiments, user interface 814, need not be included (e.g., control module 801 need not receive user input nor provide output to a user).

In some embodiments, a sensor interface (not shown) may be used to supply power to various sensors, a signal conditioner (not shown), a signal pre-processor (not shown) or any other suitable components, or any combination thereof. For example, a sensor interface may include one or more filters (e.g., analog and/or digital), an amplifier, a sampler, and an analog to digital converter for conditioning and pre-processing signals from sensor(s) 808, 810 and 812. In some embodiments, the sensor interface communicates with sensor(s) via communicative coupling which may be a wired connection (e.g., using IEEE 802.3 ethernet, or universal serial bus interface), wireless coupling (e.g., using IEEE 802.11 "Wi-Fi," or Bluetooth), optical coupling, inductive coupling, any other suitable coupling, or any combination thereof.

Sensor(s) 808, 810 and 812 may include any suitable type of sensor, which may be configured to sense any suitable property or aspect of automated garment manufacturing systems and processes 100, any other system, or any combination thereof. In some embodiments, sensor(s) 808, 810 and 812 include linear encoders, rotary encoders, or both, configured to sense relative positions, speed, temperature, pressure, etc. In some embodiments, sensor(s) includes various types of optical sensors 808 including cameras configured to capture images (e.g., time-lapse imaging) of various aspects of the operation of the automated garment manufacturing systems and processes. In some embodiments, temperature and pressure sensor(s) 812 include one or more temperature sensors such as, for example, a thermocouple, a thermistor, a resistance temperature detector (RTD), any other suitable sensor for detecting temperature, or any combination thereof. For example, sensor(s) 812 may include a thermocouple arranged to measure the temperature and/or viscosity of liquid adhesive to be applied to the webs.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments but should be defined only in accordance with the following claims and their equivalents.

What is claimed is:

1. A system for automated manufacturing of apparel, the system comprising:
    a fabric dispenser operable to dispense a first web of fabric and a second web of fabric, the first web of fabric forming a front of an apparel and the second web of fabric forming a back of the apparel;
    an adhesive dispenser configured to apply discrete non-contiguous adhesive masses to the first web of fabric, wherein the discrete non-contiguous adhesive masses are deposited along a trajectory corresponding to side seams and shoulder seams of the apparel located on the first web of fabric;
    one or more presses operable to join the first web and the second web along the side seams and the shoulder seams of the apparel;
    a cutting tool operable to make partial cuts to the first web of fabric along lines corresponding to a neck hole, bottom hem, and arm holes of the apparel located on the first web of fabric, the cutting tool further configured to cut the apparel out of a joined first web and second web of fabric by cutting along the side seams of the first web of fabric and the second web of fabric and cutting the bottom hem, the neck hole, and the arm holes on the second web of fabric; and
    a folding tool for folding the first web or the second web, wherein the folding tool is mounted on a gantry which is operable to move the folding tool to select fold areas of at least one of the first web and the second web to fold the at least one of the first web and the second web.

2. The system of claim 1, wherein the one or more presses apply one of pressure, temperature and moisture to the apparel at least along the trajectory corresponding to the side seams and the shoulder seams of the apparel.

3. The system of claim 2, wherein the one or more presses are roller presses.

4. The system of claim 2, wherein application of pressure, temperature, and moisture partially or fully cures the discrete non-contiguous adhesive masses.

5. The system of claim 1, wherein the adhesive dispenser is configured to apply the discrete non-contiguous adhesive masses shaped as one or more of: sphere, non-spherical shape and ellipses.

6. The system of claim 1, wherein the adhesive dispenser is configured to apply the discrete non-contiguous adhesive masses along a path selected from the group consisting of: single line, two or more parallel lines, zig zag and serpentine lines.

7. The system of claim 1, wherein the cutting tool includes at least one or more cutting device selected from the group consisting of a mechanical knife, a laser cutter, a plasma cutter, a water jet cutter, and an ultrasonic cutter.

8. The system of claim 1, wherein the folding tool is configured to form a double lap seam by folding a portion of the second web of fabric.

9. The system of claim 8, further comprising:
    a frame moveably coupled to the first web of fabric and the second web of fabric;
    a head carrier moveable relative to the frame; and
    at least one of the cutting tool, the adhesive dispenser, the one or more presses and the folding tool moveably attached to the head carrier and operable on the first web of fabric and the second web of fabric.

10. A system for automated manufacturing of garments, the system comprising:
    an adhesive dispenser configured to apply discrete non-contiguous adhesive masses to at least one of a first web of fabric and a second web of fabric;
    presses configured to direct the first web and the second web into contact after the discrete non-contiguous adhesive masses have been applied to form a seam of a joined garment;
    a first heater configured to apply heat to the seam;
    a cutting tool configured to free the joined garment from the first web and the second web to form a detached garment, wherein the first web of fabric forming a front of an apparel and the second web of fabric forming a back of the apparel,
- wherein the cutting tool is operable to make partial cuts to the first web of fabric along lines corresponding to a neck hole, bottom hem, and arm holes of the apparel located on the first web of fabric, the cutting tool further operable to make second partial cuts to the apparel out of a joined first web and second web of fabric by cutting along the bottom hem, the neck hole, and the arm holes located on the second web of fabric;
- a frame moveably coupled to the first web of fabric and the second web of fabric;
- a head carrier moveable relative to the frame; and
- the presses are moveably attached to the head carrier and operable on the first web of fabric and the second web of fabric.

11. The system of claim 10, further comprising a second heater configured to apply heat to the discrete non-contiguous adhesive masses prior to forming the seam.

12. A system for manufacturing of garments, the system comprising:
- one or more motors operable to convey in a synchronous manner a first web and a second web through different manufacturing operation stages, wherein the first web and the second web remain in sync at each manufacturing operation stage, and wherein each of the first web and the second web are dispensed from a respective fabric roll;
- at least one adhesive dispenser for applying non-contiguous drops of adhesive to at least part of the at least one of the first web and the second web, wherein the at least one adhesive dispenser is operable to move and dispense the adhesive within a plane of at least one of the first web and the second web;
- a cutter operable to cut select areas of at least one of the first web and the second web to produce cut areas, wherein the cut areas correspond to one or more openings in a partially manufactured garment, each opening operable to accommodate a body part to pass through the cut areas;
- a folding tool for folding the first web or the second web, wherein the folding tool is mounted on a gantry which is operable to move the folding tool to select fold areas of at least one of the first web and the second web to fold the at least one of the first web and the second web; and
- a press operable to press the first web and the second web to form the partially manufactured garment, and wherein the press activates at least some of the non-contiguous drops of the adhesive to adhere first parts of the first web to second parts of the second web, to form the partially manufactured garment.

13. The system of claim 12, further comprising a third web moving in sync with at least one of the first web and the second web, the third web is operable to dispense pockets, zippers, and seam material.

14. The system of claim 12, wherein conveying of the first web and the second web is synchronized using at least one of an indexing mechanism selected from the group consisting of indexing using invisible markings, indexing using visible markings, indexing using washable markings, indexing using perforations in the first web or the second web, and indexing using step motors.

15. The system of claim 12, wherein an adhesive deposition recipe is adjusted based on properties selected from the group consisting of fabric type, fabric weight, fabric color, garment design, garment type, adhesive deposition pattern and adhesive type.

16. The system of claim 12, wherein a cut recipe is adjusted based on properties selected from the group consisting of adhesive line width and adhesive dispensing pattern.

17. The system of claim 12, wherein a protective insert is used between the first web and the second web during a cutting operation of a layer while protecting another layer.

18. A method of manufacturing an apparel comprising:
- unwinding a first web of fabric from a first roll and unwinding a second web of fabric from a second roll wherein the first web of fabric forms a front of the apparel and the second web of fabric forms a back of the apparel;
- coupling the first web and the second web to a frame, wherein the first web and the second web are movably coupled to the frame, and wherein the frame includes a head carrier moveable relative to the frame;
- depositing discrete non-contiguous adhesive masses to the first web of fabric from an adhesive dispenser, wherein the discrete non-contiguous adhesive masses are deposited along a trajectory corresponding to side seams and shoulder seams of the apparel located on the first web of fabric;
- cutting the first web of fabric along a neck hole, arm holes and bottom hemline with a cutting tool;
- placing the second web of fabric on the first web of fabric;
- applying pressure to join the first web of fabric and the second web of fabric via one or more presses, wherein the one or more presses is moveably attached to the head carrier and operable on the first web of fabric and the second web of fabric;
- cutting the second web of fabric along the neck hole, the arm holes and the bottom hemline, wherein the cuts of the first web of fabric are not aligned with the cuts of the second web of fabric; and
- cutting the apparel out of joined first web and second web of fabric.

19. The method of claim 18, wherein application of one of second pressure, heat, radiation, and moisture causes partial of full curing of the discrete non-contiguous adhesive masses.

20. The method of claim 18, further comprising folding at least one of the first web of fabric and the second web of fabric before or after depositing the discrete non-contiguous adhesive masses to form a seam.

* * * * *